United States Patent [19]

Sneed, Jr. et al.

[11] Patent Number: 5,717,748
[45] Date of Patent: Feb. 10, 1998

[54] MEANS AND METHOD FOR UPDATING DATABASES SUPPORTING LOCAL TELEPHONE NUMBER PORTABILITY

[75] Inventors: Elbert Lee Sneed, Jr., Wheaton; Dorothy V. Stanley, Warrenville, both of Ill.

[73] Assignee: Lucent Technologies Inc., Murray Hill, N.J.

[21] Appl. No.: 724,380

[22] Filed: Oct. 1, 1996

Related U.S. Application Data

[63] Continuation of Ser. No. 330,413, Oct. 28, 1994, abandoned.

[51] Int. Cl.$^6$ .................................................. H04M 3/42
[52] U.S. Cl. ........................... 379/207; 379/111; 379/219
[58] Field of Search .................................. 379/111, 112, 379/115, 701, 207, 210, 213, 219, 220

[56] References Cited

U.S. PATENT DOCUMENTS

| | | | |
|---|---|---|---|
| 4,186,438 | 1/1980 | Benson et al. | 364/200 |
| 4,924,510 | 5/1990 | Le | 379/221 |
| 5,012,511 | 4/1991 | Hanle et al. | 379/211 |
| 5,136,707 | 8/1992 | Block et al. | 395/600 |
| 5,259,026 | 11/1993 | Johnson | 379/207 |
| 5,303,285 | 4/1994 | Kerihuel et al. | 379/58 |
| 5,319,699 | 6/1994 | Kerihuel et al. | 379/58 |
| 5,386,467 | 1/1995 | Ahmad | 379/220 |
| 5,416,833 | 5/1995 | Harper et al. | 379/201 |
| 5,418,844 | 5/1995 | Morrisey et al. | 379/207 |
| 5,428,679 | 6/1995 | French | 379/201 |
| 5,440,541 | 8/1995 | Iida et al. | 379/207 X |
| 5,463,682 | 10/1995 | Fisher et al. | 379/201 |
| 5,481,603 | 1/1996 | Gutierrez et al. | 379/221 |
| 5,509,058 | 4/1996 | Sestak et al. | 379/201 |

OTHER PUBLICATIONS

"Electronic Switching Progress in the World (VI)", Report on ISS at Pheonix, ISS 87, Commutation & Transmission N° Apr. 1987, pp. 7–87, P.Collet.

"Perspectives on the AIN Architecture", IEEE Communications Magazine Feb. 1992, pp. 27–32, R. K. Berman et al.

*Primary Examiner*—Krista Zele
*Assistant Examiner*—Scott L. Weaver

[57] ABSTRACT

This invention provides a means and method for updating two-tiered databases in a telecommunications system which support local number portability through call connection information sets stored on the databases. Pro-active updating is accomplished by tracking location, time and frequency of each switch querying the first tier centralized database for each stored call connection information set. At the time an update is made to a call connection information set at the first tier database, the set is offered to all second tier databases supporting individual switches which have queried the centralized database for that set. Second tier databases accept the set as an update, a new set or reject. Acceptance of a new set or rejection is dependent upon the set achieving a ranking based on recency and frequency of query above the threshold for storage. The second tier databases provide confirmation of set acceptance and rejection to the first tier database.

18 Claims, 4 Drawing Sheets

MEANS AND METHOD FOR UPDATING DATABASES SUPPORTING LOCAL TELEPHONE NUMBER PORTABILITY

This application is a continuation of application Ser. No. 08/330,413 filed Oct. 28, 1994, now abandoned.

FIELD OF THE INVENTION

This invention relates to a means and method to update a tiered database system, characterized by a centralized database and switch-dedicated databases, in a telecommunications system to support phone number portability.

BACKGROUND OF THE INVENTION

Today, each telephone service subscriber's telephone number is associated with a specific geographic local telecommunications service provider and that provider's local switch. Each subscriber's unique telephone number consists of a three digit area code, called an "NPA" number; a three digit local switch prefix, called the "NXX" number, and the subscriber's own four digit number, called the "XXXX" number. The "NXX" number is associated with the particular local switch that maintains the number. With conventional telephone systems, the three digit "NXX" number identifies a specific, unique local switch managed by a single local telephone service provider. Because the NXX number identifies a specific switch to the system, any change in the switch providing service to the subscriber mandates the assignment of a new number within the telephone system for the subscriber's telephone service.

As described in pending U.S. patent application Ser. No. 08/329,595, titled "Means and Method for Providing Local Telephone Number Portability," by inventors E. L. Sneed Jr. and D. V. Stanley, which is hereby incorporated by reference, subscriber portability is achieved and post-dial delay time is controlled by storing in the telecommunications system virtual service numbers with their correlated call connection information set, the call connection information set containing augmenting information which when provided along with or in substitution for the dialed digits is the equivalent of the actual service number of the intended destination subscriber from the perspective of call connection across the telecommunications system. Each call connection set contains other information relevant to the virtual number or the subscriber as well. The virtual number is the number listed in directories and dialed by callers attempting to reach the intended subscriber and may or may not contain the NXX number for the switch serving that destination subscriber. By the switch initiating a call using the dialed virtual service number to access the proper call connection information set for the intended destination subscriber, the call can be properly placed across the telecommunications network.

The above-identified application contemplates that all call connection information sets will be stored in an industry-wide centralized database referred to as the Industry or IN Database which, upon query from a local call initiating switch, will provide in response the appropriate call connection information set correlated to the dialed service number offered in the query. The IN Database may not be a single unit but may comprise several databases, for example each industry service provider maintaining a database for its part of the telecommunications network, but which act in concert to direct calls throughout the system.

The above-identified application recognizes that querying a single centralized database, even when composed of more that a single unit, could overburden the database and result in unacceptable post-dial delay. Consequently the above-identified application provides additional databases, referred to as Switch Resident Databases or SRDB's. When a call is initiated, the serving local switch acts as the call initiating switch and queries its dedicated SRDB for the call connection information set corresponding to the dialed virtual number.

Each SRDB stores a limited number of call connection information sets in memory, and dynamically ranks sets according to the recency and frequency of corresponding calls dialed into the SRDB's serviced switch. Because of the limited storage of call connection sets in an SRDB, the SRDB is able to quickly process any query and provide a response to the switch, thus minimizing post-dial delay. A counterbalancing consequence of providing limited memory, or storage capacity, for call connection sets in an SRDB is that it is likely that not all queries made by the switch to its dedicated SRDB would find a corresponding call connection set stored in the SRDB.

The above-identified application then contemplates that the call initiating switch would query the IN Database which, as the industry repository of call connection sets, will respond with the appropriate call connection information to the switch. When a switch queries the IN Database, it offers the information received from the IN Database for ranking by the SRDB and potential retention in memory.

The problem is that the databases, both SRDB's and the IN Database, must be dynamic repositories of call connection information sets in order to deal with the constant ebb and flow of subscribers, callers and system features. If outmoded call connection information sets are left on an SRDB, it becomes likely that callers will become disgruntled by calls being improperly placed, the desired service being declared unavailable or being provided some negative message or signal indicating the call cannot go through as dialed. The information stored by each SRDB needs to be accurate and up to date in order to allow the subscriber to benefit from a system utilizing local number portability.

There is therefore a need to provide a means and method for updating the IN Database and dynamically updating SRDB's as the IN Database is updated.

SOLUTION

While the invention of above identified application solves the problem of providing local number portability, shortcomings exist in updating the network databases serving the many local switches. The present invention recognizes the need for a pro-active updating capability as part of a telecommunications system supporting local number portability and accomplishes this by providing a Service Management System or SMS operating at several levels in the system.

Service management systems ("SMS") are part of existing telecommunications systems applications such as 800 number databases, but deal with updating at only the level of the single database.

There is therefore a need for a means and method that updates tiered databases.

My invention is implementable with existing technology and equipment and takes advantage of current network architectures.

The problem of updating tiered databases including multiple SRDBs is solved by a funnelling function wherein the service management system (SMS) updates the Industry Database (IN Database) and the IN Database, in turn, updates the SRDB's. When the IN Database receives an update, the IN Database determines which switches in the system contain the record of the number which has been updated. The IN Database then sends the updated information to the switches that contain the number.

At the IN Database level, the SMS tracks which switches have in their dedicated SRDB a given call connection set and, when that call connection set is updated for the IN Database, the SMS determines which switches/SRDB's are storing the now outdated call connection set and directs the IN Database to provide the current updating information to those switches/SRDB's.

In accordance with one aspect of my invention, a telecommunications system is provided with at least one centralized database which stores call connection information regarding telephone service numbers which can be accessed by switches requiring call connection information to properly initiate calls.

In accordance with a further aspect of my invention, a local switch responsible for originating and routing calls initiated by subscribers assigned to that switch has associated with it a dedicated database which the switch accesses for call connection information.

In accordance with another further aspect of my invention, the database dedicated to the switch dynamically stores no more than a finite number of telephone service numbers and the associated call connection information.

In accordance with another aspect of my invention, a service management system updates the Industry Database, tracks the storage of call connection sets in switch dedicated databases and updates call connection information sets stored by the switch dedicated databases at the time the IN Database receives updated call connection set information.

In accordance with an additional aspect of my invention, the IN Database may communicate a call connection information set update individually to switch dedicated databases or bundle call connection information set updates and then communicate the updates in bundled form to the appropriate switch dedicated database or databases.

DETAILED DESCRIPTION

Figure 1:
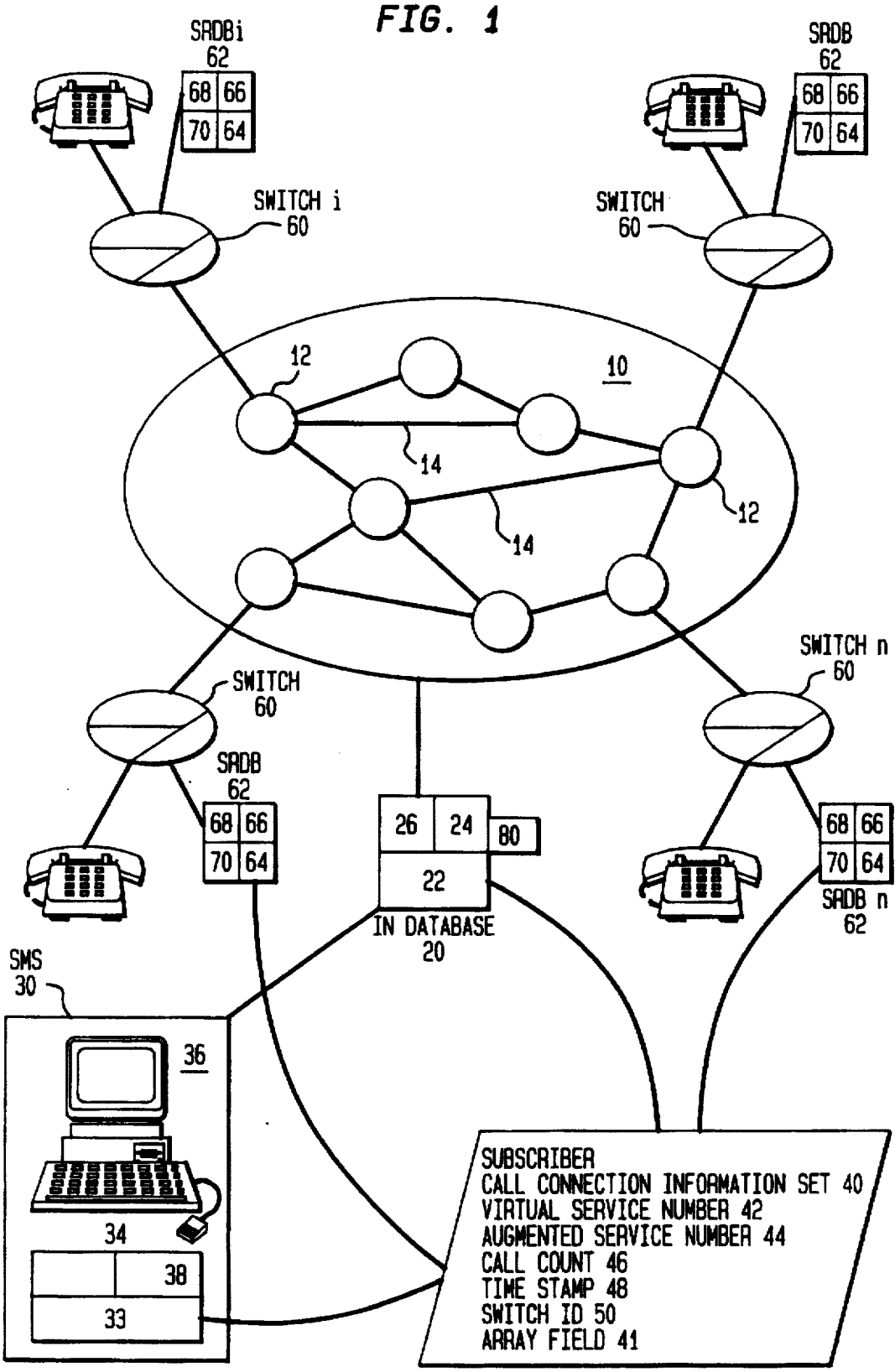
FIG. 1 illustrates a schematic of the elements comprising the invention.

FIG. 1 is a diagram illustrating the architecture and hierarchy of a telecommunications system supporting local number portability illustrating the pro-active updating of the present invention. The telecommunications system 10 is composed of numerous nodes 12 and channels 14. In addition, at least one Industry Database or IN Database 20 is resident in the telecommunications system 10.

The IN Database 20 is comprised of a central processing unit 22, a memory 24, and administering software 26. It is to be appreciated that the IN Database may be composed of more than a single central processing unit 22, memory 24 and/or software 26, but for clarity the IN Database in the preferred embodiment will be discussed as a single unit made up of these singular components.

The IN Database 20 is provided call connection set updates by a Service Management System (SMS) 30 comprised of at least one administrator's workstation 32 including a central processing unit 33, a key pad and mouse 34, monitor 36 and software 38. Among other things, software 38 contains a security function which requires that a user pass through security and authorization checks before accessing information or providing information, either initially as new information or subsequently as update information, to the IN Database 20. As new subscribers are added to the telecommunications system, the administrator, using the SMS 30, provides call connection information for each subscriber in a determined and desired format to the IN Database 20 which stores the information in memory 24 as a call connection information set 40. Each call connection information set includes the number which callers will dial when desiring to reach a specific subscriber referred to as virtual service number 42; augmenting information 44 which either in concert with or in substitution for the virtual service number provides the equivalent of the number the telecommunications system recognizes as the true number for the subscriber; and other information relevant to the subscriber and the call connection information set's activity within the system. Such other information includes a call count file 46 in which the tally of queries to the IN Database for that call connection information set is kept; a time stamp file 48 in which the date and time corresponding to each query is kept; and a Switch ID file 50 in which locating information for each local switch querying for that call connection information set is kept. The various numbers, files and other subscriber information are allocated to specific array fields 41 such that data in a specific field is separately recoverable from the complete call connection information set.

Across the telecommunications system 10 are various local switches 60 through which calls are initiated. Each local switch 60 has associated with it a dedicated Switch Resident Database (SRDB) 62 which includes a local central processing unit 64; a local memory 66; query, search and respond software for recovering call connection data sets 40 from memory 66 and delivering them to the served local switch 66; ranking software 70 for assigning a hierarchical rank to each call connection data set 40 available to the SRDB according to a desired scheme based upon the recency and frequency of query for each data set; and updating software 68 which receives updating information from the IN Database 20 through local switch 60 and updates the call connection sets 40 then resident in memory 66.

Figure 2:
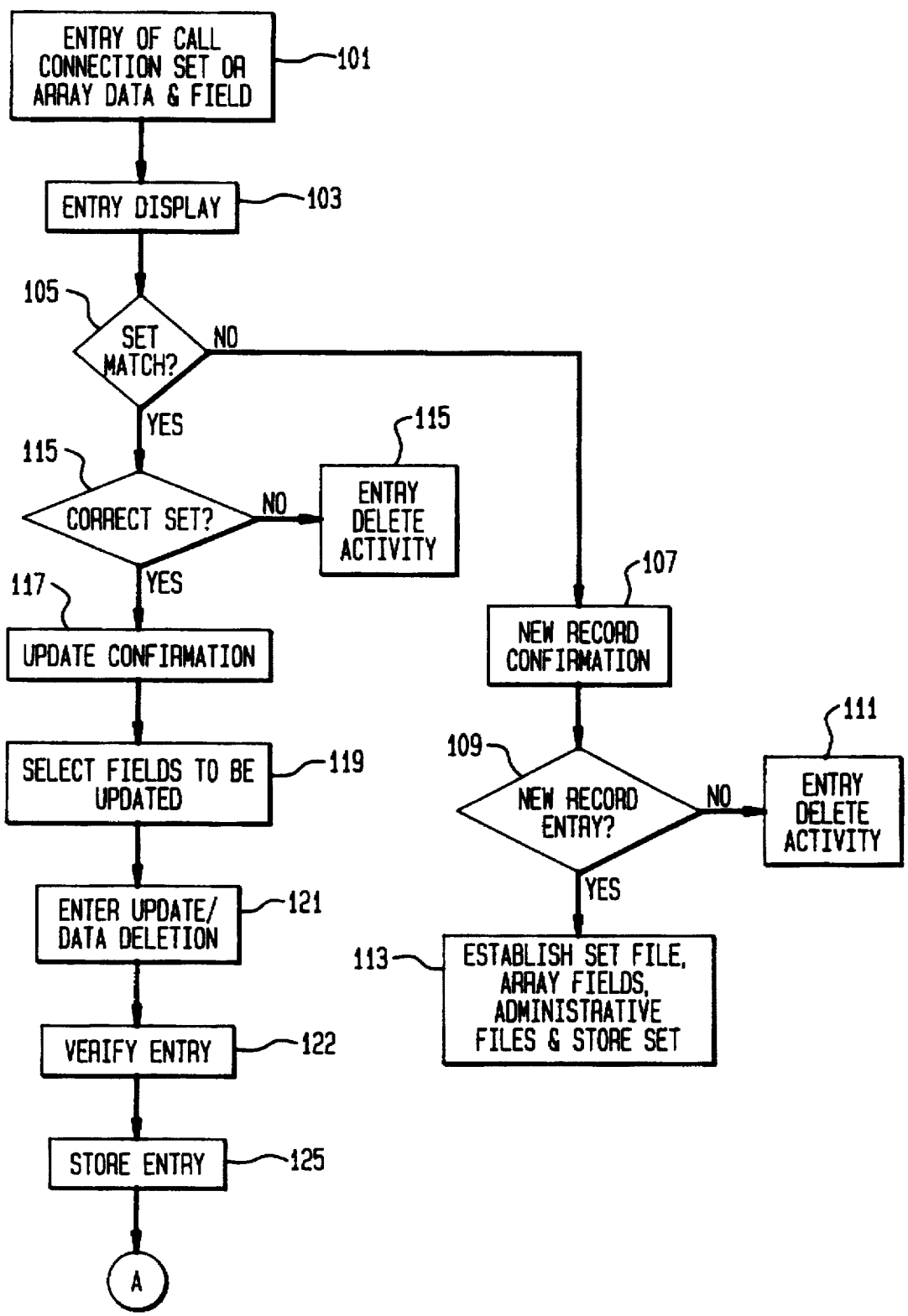
FIG. 2 illustrates a flow diagram of first tier update administration occurring at the IN Database.

Viewing FIG. 2 in conjunction with FIG. 1, the method of the instant invention will be described. Upon each call connection set 40 being entered 101 through keypad 34 by the administrator, it is displayed 103 on monitor 36 and presented to the IN Database 20, by the SMS software 38. The data making up the set is compared 105 against the existing data in IN Database memory 24 by administering software 26. If no corresponding current information exists, the administering software 26 provides a new record confirmation 107 back to the SMS 30 for display on monitor 36 to the administrator and the administrator elects 109 to enter the new record in the IN Database 20 by entering an appropriate positive response through keypad 34. The administering software 26 then places the data in memory 24 and establishes 113 appropriate administrative files, such as call count 46 which tallies the number of times the IN Database is queried for the call connection data set 40; time stamp 48 which records the time and date of queries; and Switch ID 50 which records identifying information on each local switch 60 which has the call connection information set 40 stored in its dedicated SRDB 62.

In instances where the administrator is reporting to the system 10 a change in call connection data for an existing record, for example, a change in the terminating switch NXX designation, which will permit the system to continue to properly connect calls to that subscriber by dialing the subscriber's virtual service number 42, a similar pattern of update initiation by the administrator through the SMS 30 and response by the IN Database occurs. However, in the instance of an update, the IN Database 20 provides the SMS a response 117 indicating the existence of a call connection data set having the corresponding data in the array field 41 identified by the administrator. The array field 41 is the particular field type, i.e., that portion of the data known to contain information of a particular predetermined category. In the instant example, the administrator is able to and may query for either the virtual service number, augmenting information in a specific array field, or the subscriber's name, or whatever other information or combination of array field types and keying information that is sufficient for the administering software 26 to search records. By also identifying the field type 41 of interest in the search, a more focused search is provided. The administrator is then presented on monitor 36 those call connection data sets 40 which contain matching data in the specified array field or fields 41. This creates the capability for the administrator to confirm the integrity and appropriateness of each call connection information set 40 then maintained by the IN Database 20 and furthermore verify all call connection information, if desired, in any specific call connection information set 40 and in each array field 41 within that set. Since Switch ID 50 is also an array field comprising a part of each information set 40, the administrator is also able to survey local switches 60 affected by an update or to provide a verification index which the administrator can use to confirm that any change is properly funneled down to each affected local switch 60 and its dedicated SRDB 62.

Similarly, data in any array field 41 or a complete call connection information set 40 can be deleted by the administrator. This permits targeted maintenance of the call connection data sets 40 and avoids the need for wholesale purging of data in the IN Database because of the security authorizations necessary to modify the data; the presentation of records in a fashion which augments record integrity; and targeting changes to specific array fields to avoid inadvertent modification of data sets.

Figure 3A:
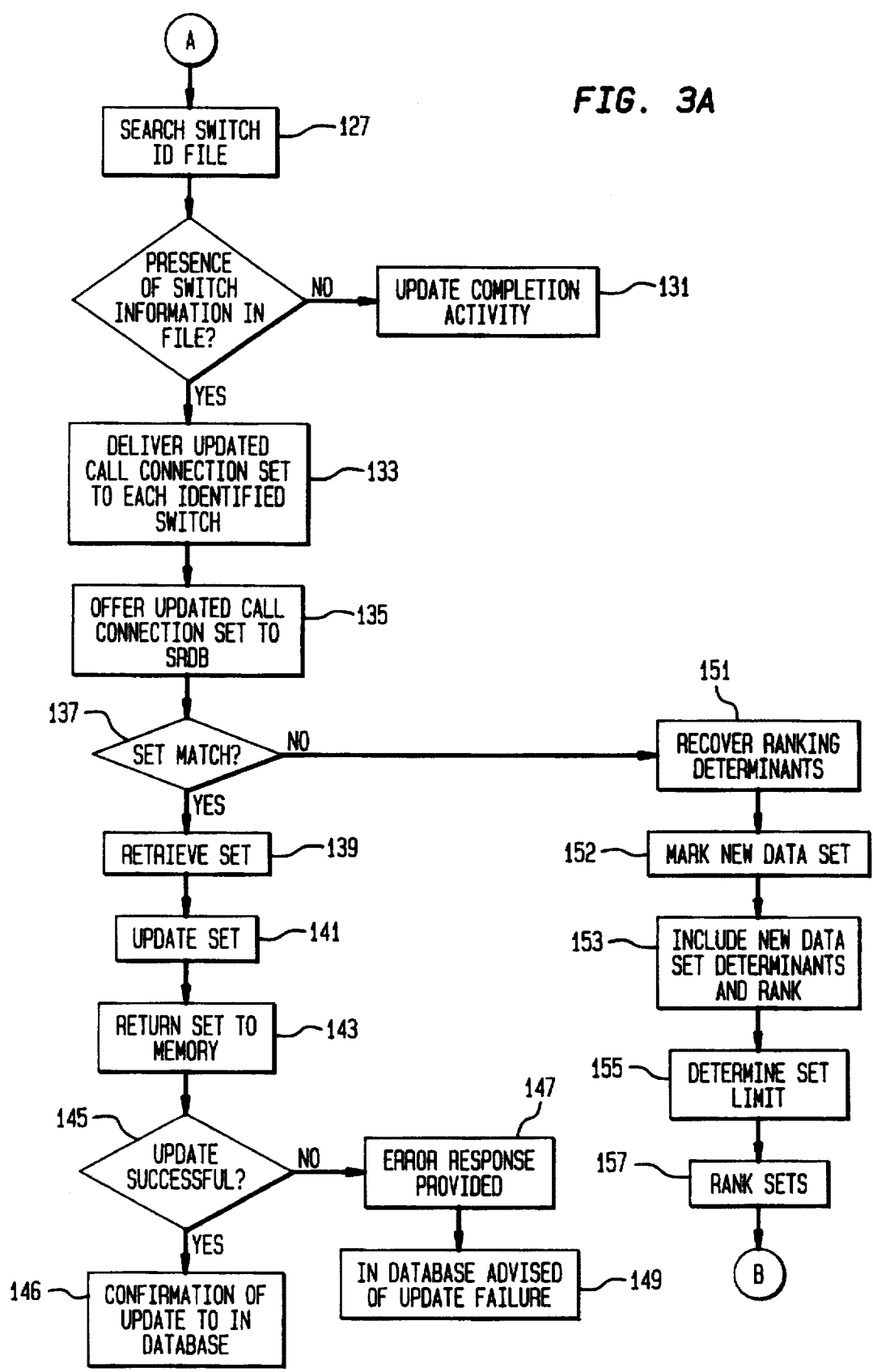
FIGS. 3A and 3B illustrate a flow diagram of the second tier updating and set maintenance between the IN Database and local switch resident databases.
Figure 3B:
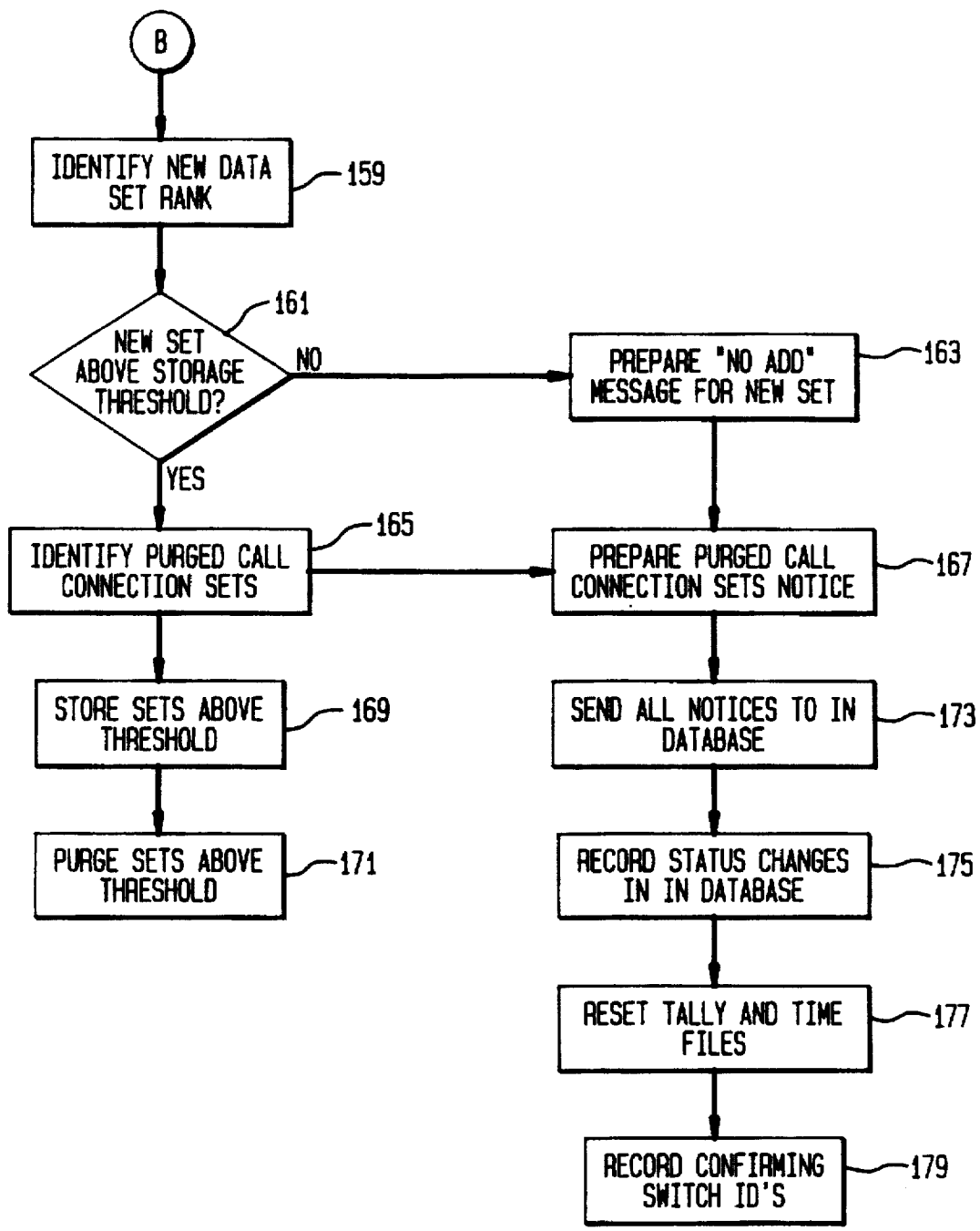

As shown in FIGS. 3A and 3B, each time any call connection information set 40 is altered in the IN Database in a fashion which would impact a local switch's ability to properly implement call connection to the intended subscriber, the information is offered to local switches 60 for updating of the respective dedicated SRDB 62. An innovative feature of the instant invention is that it recognizes that it is not necessary to store every change in a call connection information set 40. Rather, the instant invention targets only each local switch 60 which has previously stored the call connection information set of interest in its dedicated SRDB 62. Since each switch 60 initially queries its dedicated SRDB 62 for a call connection information set, then queries the IN Database if the information set 40 is not provided by the SRDB, there is no need to update all switches 60. Those switches 60 which require updates to bring an information set then resident on its dedicated SRDB are updated at the time the IN Database is updated and those switches which do not require updating because the information set is absent from the dedicated SRDB are subsequently provided the information set 40 at the time that switch so queries the IN Database 20.

At the time the IN Database receives a change in a call connection information set 40, administering software 26 recovers 127 from memory 24 the identification and contact information for each switch 60 appearing in the Switch ID file 50. The administering software 26 then delivers 133 the call connection information set 40 to each switch 60 so identified throughout the telecommunications system 10. Upon receipt of each call connection information set offered by the IN Database, the switch 60 delivers the information set 40 to the dedicated SRDB 62.

As mentioned above, each SRDB 62 includes a central processing unit 64, local memory 66, updating software 68 and ranking software 70. Upon an SRDB's receipt 135 of an offered call connection information set, the updating software 68 searches 137 memory 66 for any matching call connection information set 40, retrieves 139 the corresponding information set, selects the proper array field and updates 141 the appropriate data, returns 143 the now current call connection information set 40 to local memory 66, and confirms 145 through switch 60 to IN Database 20 that the update has been made. If a corresponding call connection information set 40 is found, but the SRDB fails to update 145 for any reason, the IN Database is likewise informed 149 of the event and administering software 26 provides pertinent information 147 to an error report file 80. If there is no corresponding information set found in memory 66, ranking software 70 recovers 151 from memory 66 pertinent information for each stored call connection information set and performs within local CPU 64 a hierarchical ranking 153 of each information set 40 then available to the SRDB, including the information set then offered by the IN Database. As is the case with the IN Database, the SRDB contains call count 46 and time stamp 48 files as part of each call connection information set 40. The ranking software 70 extracts this information and utilizes the recency and frequency of use/query for each call connection information set 40 to develop a hierarchical ranking 157 of all call connection information sets according to a desired scheme. Ranking software 70 also determines 155 the storage limit of memory 66 for call connection information sets and either adds, retains 169, or purges 171 call connection information sets 40 from memory 66 depending upon each information set's ranking against the storage threshold. Updating software 68 captures identifying information 163 & 167 pertaining to the status of added and purged information sets 40 and communicates this information 173 through switch 60 to IN Database 20.

Upon receipt by the IN Database of the status information provided by a switch 60, administering software 26, acting in concert with central processing unit 22 and memory 24, records 175 in memory 24 the status changes communicated from the switch 60 in the corresponding call connection information sets in the appropriate array field held in memory 24. Thus, the switch 60 confirms that an offered information set 40 has indeed been added to its dedicated SRDB, or has not, or that an information set 40 previously resident on its dedicated SRDB has been purged. The administering software 26, in the instance of a purged information set, deletes the switch location information from the Switch ID field and, in the instance of an added information set, records the switch location information in the Switch ID field. While not essential to the practice of the invention, in the preferred embodiment, the administering software also records in an array field for that information set an identification of each switch providing confirmation regarding the information set back to the IN Database. This permits the administering software to generate information to verify proper functioning of the updating operation by an internal checking operation or through report generation for use by system administrators.

Providing confirmation of information set storage status at the local switch level back to the IN Database provides further assurance of call connection set integrity at the IN Database level by targeting actual storage by the SRDB as triggering updating of the information in Switch ID 50 by administering software 26 rather than the false target of the IN Database providing a call connection information set 40 to a specific switch. This permits the administering software 26, in the instance of a purge notice, to reset 177 the call count file 46 and the time stamp file 48 comprising part of that call connection information set 40 stored in IN Database 20. Likewise, in the instance of an add notice, the administering software 26 records 179 the confirming switch identification information in Switch ID file 50 in that call connection information set 40.

While in the preceding discussion, each communication between the IN Database 20 and the local switches 60 is considered as a singular event, it is appreciated that a reduction of line traffic and an increase in efficiency can be achieved by bundling updating information intended for a specific switch and bundling status information from a specific switch to the IN Database. Bundling can be achieved by adopting any of a variety of methods common to local area network computer data systems.

While in the foregoing description of the preferred embodiment of the invention the administering software is resident on the IN Database, it is recognized that the administering software could be resident elsewhere on the system, for example on the administrator's workstation which simply accesses IN Database memory to update, add and delete records. Likewise, it is recognized that the ranking and updating software described as being resident on each dedicated SRDB can as easily be resident elsewhere, for instance on the served switch itself which accesses SRDB memory to update, rank, add and delete call connection information sets. Further, the administrator's workstation is described as providing commands and inputting information through a keypad and mouse. Alternative embodiments such as touch screens and voice recognition software provide the same functions. Likewise, the dissemination of updates to SRDBs is presented as being contemporaneous with updating of the IN Database. The present invention encompasses delaying and/or bundling updates to reduce administrative line traffic in the system and/or to delay line traffic to off-peak system usage times.

It is to be understood that the above description is only one of the preferred embodiments of the invention. Numerous other arrangements may be devised by one skilled in the art without departing from the spirit and scope of the invention. The invention is thus limited only as defined in the accompanying claims.

We claim:

1. Apparatus for updating call connection information in both tiers of a two tiered telecommunications system supporting local number portability using call connection information sets, each call connection information set related to a subscriber, various pieces of information making up each call connection information set each associated with a determined array field, the telecommunications system including, as part of the first tier of the telecommunications system, a centralized database containing each call connection information set in the telecommunications system, with the various pieces of information making up each call connection information set stored in the associated determined array field, and including as part of the second tier of the telecommunications system a plurality of switches each particular switch served by a dedicated database containing a limited number of the call connection information sets dynamically maintained based upon recency and frequency of query by the particular switch served by the dedicated database to the dedicated database for the call connection information sets, the dedicated database being the first database queried by the particular switch served by the dedicated database, the apparatus comprising:

a means for providing update information to the telecommunications system for at least one of the call connection information sets, the update information comprised of the various pieces of information for the at least one call connection information set;

a first means for providing the update information first to the centralized database; and a second means for providing the update information from the centralized database to each switch dedicated database, said second means for providing the update information including administering software which (i) determines if the update information is to a call connection information see resident on the centralized database and if so, updates the various pieces of information in the determined array fields in the centralized database;

(ii) determines if the update information is to a call connection information see absent from the centralized database and if so, adds the absent call connection information set in the centralized database; and (iii) establishes and administers for each of the call connection information sets a call count file, a time stamp file and a switch identification file, the administering software recording, in the switch identification file, switch identification information for each switch querying the centralized database for each respective call connection information set; tallying, in the call count file, the number of queries from each switch for each respective call connection information set, the tally representing the frequency of query by each switch; and recording, in the time stamp file, the date and time of each query from each switch, representing the recency of query of each switch, the tally in the call count file correlated to the date and time in the time stamp file and the switch identification information in the switch identification file.

2. The apparatus of claim 1 in which the means for providing the update information from the centralized database to each switch dedicated database includes the administering software on the centralized database which, upon the receipt of the update information to a call connection information set, retrieves from the switch identification file the switch identification information for each switch which queried the centralized database for the call connection information set affected by the update information and offers the update information, including the corresponding information in the call count file and the time stamp file, to each switch for which switch identification information is retrieved from the switch identification file.

3. The apparatus of claim 2 in which the means for providing the update information from the centralized database to each switch dedicated database includes updating software for each switch dedicated database, the updating software receives the update information to the call connection information set affected by the update information offered by the centralized database, searches the dedicated database for the call connection information set affected by the update information, retrieves the call connection information set affected by the update information, and updates the various pieces of information making up the call connection information set affected by the update information in the determined array fields.

4. The apparatus of claim 3 in which the updating software further confirms through the switch served by the dedicated database to the centralized database whether the call connection information set affected by the update information has been updated.

5. The apparatus of claim 4 in which the second means for providing the update information includes ranking software for each dedicated database which extracts from each call connection information set in the dedicated database or which is offered for addition to the dedicated database, the date and time from the time stamp file and the tally from the call count file for each call connection information set in the dedicated database or offered for addition to the dedicated database, reflecting, respectively, the recency and frequency of queries for each call connection information set in the dedicated database or offered for addition to the dedicated database by the switch served by the dedicated database, and utilizes the date and time from the time stamp file and the tally from the call count file for each call connection information set in the dedicated database or offered for addition to the dedicated database to develop a hierarchical ranking of each call connection information set in the dedicated database or offered for addition to the dedicated database, the hierarchical ranking achieved by a scheme which uses the recency and frequency of queries for each call connection information set in the dedicated database or offered for addition to the dedicated database in establishing relative rank; the ranking software determines the storage limit in the dedicated database for call connection information sets and either adds, retains, or purges each particular call connection information set from the dedicated database depending upon the particular call connection information set's ranking against the storage limit; and the ranking software identifies to the updating software which of the particular call connection information sets are added and which of the particular call connection information sets are purged.

6. The apparatus of claim 5 in which the updating software includes a function for identifying the particular call connection information sets added to the dedicated database and the particular call connection information sets purged from the dedicated database and communicates through the switch served by the dedicated database identifications of the particular call connection information sets added to the dedicated database and identifications of the particular call connection information sets purged from the dedicated database to the centralized database, and the administering software in the centralized database includes a function which records the identifications of the particular call connection information sets added to the dedicated database and separately records the identifications of the particular call connection information sees purged from the dedicated database.

7. The apparatus of claim 6 in which the administering software includes a function which, for the particular call connection information sets recorded as purged from the dedicated database, identifies the switch served by the dedicated database and deletes the switch identification information from the switch identification files in the centralized database for the particular call connection information sets recorded as purged from the dedicated database.

8. The apparatus of claim 7 in which the administering software includes a function which, for the particular call connection information sets recorded as added to the dedicated database, identifies the switch served by the dedicated database and adds the switch identification information to the switch identification files in the centralized database for the particular call connection information sets recorded as added to the dedicated database.

9. A method for updating call connection information in a telecommunications system having a two-tiered database system using call connection information sets, each such call connection information set including call connection information to translate from a dialed number to associated connection data, and in which the first tier of the telecommunications system includes a centralized database having first memory containing all the call connection information sets existing in the telecommunications system; and in which the second tier of the telecommunications system includes a plurality of switches and a plurality of dedicated databases having second memory, a particular switch of the plurality of switches served by a particular dedicated database of the plurality of databases, and the particular database containing in the second memory less than all the call connection information sets existing in the telecommunications system, based upon a storage limit for call connection information sets, the particular switch first requesting a particular call connection information set from the particular dedicated database and second requesting the particular call connection information set from the centralized database if the particular call connection set is not found in the particular dedicated database, the method comprising the steps of:

identifying within the telecommunications system update information to at least one call connection information set;

first providing the update information to the centralized database which includes the steps of
determining whether the update information affects a call connection information set contained in the centralized database or is for a call connection information set absent from the centralized database;
when the determination is that the update information affects a call connection information set contained in the centralized database, retrieving the affected call connection information set from the first memory; modifying the affected call connection information set with the update information, and returning the call connection information set to the first memory;
when the determination is that the update information affects a call connection information set absent from the centralized database, adding the absent call connection information set to the centralized database in the first memory; establishing in the first memory a switch identification file, a call count file in which a tally is kept of the number of requests by each of the plurality of switches to the centralized database for the added call connection information set, the tally representing the frequency of request by each of the plurality of switches, and a time stamp file for the added call connection information set in which is kept the date and time of the most recent request by each of the plurality of switches for the added call connection information set, the date and time representing the recency of request by each of the plurality of switches; and selectively providing the update information from the centralized database to the particular dedicated database in the second tier.

10. The method of claim 9, in which the step of providing the update information to the centralized database includes, for the request by the particular switch to the centralized database for the particular call connection information set, the steps of:

recording switch identification information for the particular switch requesting the particular call connection information set in the switch identification file for the particular call connection information set;

adding one to the tally in the call count file for the particular call connection information set for the particular switch requesting the particular call connection information set;

recording in the time stamp file for the particular call connection information set, the date and time of the request from the particular switch requesting the particular call connection information set; and correlating the switch identification information in the switch identification file, to the tally in the call count file, and to the date and time in the time stamp file for the call connection information set.

11. The method of claim 10, in which the step of selectively providing the update information from the centralized database to the particular dedicated database includes, for the call connection information set affected by the update information, the steps of:

retrieving switch identification information from the switch identification file for the call connection information set affected by the update information; and offering to each switch identified thereby the call connection information set.

12. The method of claim 11, in which the step of selectively providing the update information from the centralized database to the particular dedicated database also includes the steps of:

each identified switch receiving the offered call connection information set and forwarding the offered call connection information set to the particular dedicated database;

searching the second memory for the call connection information set affected by the update information;

retrieving from the second memory the call connection information set affected by the update information;

replacing the call connection information set affected by the update information with the offered call connection information set; and placing the offered call connection information set in the second memory.

13. The method of claim 12, in which the step of selectively providing the update information from the centralized database to the particular dedicated database also includes the step of:

each identified switch confirming to the centralized database that the offered updated call connection information set has been received.

14. The method of claim 13, in which the step of providing the update information from the centralized database to the particular dedicated database also includes the steps of:

the centralized database providing as part of the update information for the offered call connection information set, for each identified switch, the tally in the call count file and the date and time in the time stamp file correlated to the switch identification information which identified the switch with the call connection information set;

utilizing the tally in the call count file and the date and time in the time stamp file to rank the call connection information set against the less than all call connection information sets in the particular dedicated database;

determining the storage limit in the particular dedicated database for call connection information sets;

either adding, retaining or purging a ranked call connection information set from the dedicated database depending upon its rank against the storage limit; and identifying to the identified switch the ranked call connection information set if the ranked call connection set is added, and its status as "added", and identifying to the identified switch the ranked call connection information set, if the ranked call connection set is purged, and its status as "purged".

15. The method of claim 14, in which the step of selectively providing the update information from the centralized database to the particular dedicated database also includes the steps of:

each identified switch indicating as status changes to the centralized database which call connection information sets were added to the dedicated database for that identified switch and which call connection information sets were purged from the dedicated database for that identified switch to the centralized database; and recording the status changes communicated from each identified switch in a determined array field of the affected call connection information set on the centralized database.

16. The method of claim 15, in which the step of selectively providing the update information from the centralized database to the particular switch dedicated database also includes the step of:

for each identified switch which responds to the centralized database with an indication of a call connection information set being purged from the dedicated database for that switch, deleting from the switch identification file for that call connection information set in the centralized database, the switch identification information for that switch.

17. The method of claim 16, in which the step of selectively providing the update information from the centralized database to the particular dedicated database also includes the step of:

if the identified switch responds to the centralized database with an indication of the status of the ranked call connection information set as "added", adding to the switch identification file for the ranked call connection information set in the centralized database, the switch identification information for the identified switch.

18. Apparatus for updating call connection information in both tiers of a two tiered telecommunications system supporting local number portability using call connection information sets each related to a subscriber, various pieces of information making up each call connection information set each associated with a determined array field, the telecommunications system including, as part of the first tier of the telecommunications system, a centralized database containing all the call connection information sets existing in the telecommunications system with the various pieces of information making up each such call connection information set stored in the associated determined array field, and including as part of the second tier of the telecommunications system a plurality of switches a particular switch of the plurality of switches having a dedicated database containing less than all the call connection information sets existing in the telecommunications system dynamically maintained based upon recency and frequency of request by the particular switch for each of the call connection information sets existing in the telecommunications system, the dedicated database being the first database queried by the particular switch for call connection information sets, the apparatus comprising:

(a) update information for one or more call connection information sets;

(b) an administrator's workstation including:
   a central processing unit;
   a monitor;
   a keyboard; and
   service management software for providing the update information first to the centralized database and for changing the information in the determined array fields for each call connection information set to which the update information relates;

in which the service management software displays on the monitor the various pieces of information making up each call connection information set to which the update information relates and displays changes to the various pieces of information entered through the keyboard; and in which the service management software provides the changes to the centralized database as an update;

the service management software including administering software which determines if the update is to a call connection information set contained in the centralized database and if so, updates the information in the determined array fields for the call connection information set in the centralized database;

the administering software determines if the update is to a call connection information set absent from the centralized database and if so, adds the absent call connection information set in the centralized database;

the administering software establishes and administers for each call connection information set contained in the centralized database a call count file, a time stamp file and a switch identification file, the administering software recording, in the switch identification file, switch identification information for each switch querying the centralized database for the call connection information set; tallying, in the call count file, the number of queries from each switch for the call connection information set, the tally representing the frequency of query; and recording, in the time stamp file, the date and time of each query from each switch, the date and time representing the recency of query, the tally in the call count file correlated to the corresponding date and time in the time stamp file and the corresponding switch identification in the switch identification file; and (c) means for providing the update information from the centralized database to the dedicated database.

* * * * *